United States Patent [19]

Oishi et al.

[11] Patent Number: 5,270,150
[45] Date of Patent: Dec. 14, 1993

[54] OPTICAL RECORDING MEDIUM AND PROCESS FOR PRODUCING IT

[75] Inventors: Kenji Oishi; Mikiya Kuroda, both of Yokohama; Toshinori Kawanishi, Yokosuka; Koji Tsujita, Yokohama, all of Japan

[73] Assignee: Victor Company of Japan, Ltd., Yokohama, Japan

[21] Appl. No.: 1,423

[22] Filed: Jan. 7, 1993

Related U.S. Application Data

[63] Continuation of Ser. No. 687,659, Apr. 19, 1991, abandoned.

[30] Foreign Application Priority Data

Apr. 25, 1990 [JP] Japan .................................. 2-109689
Apr. 25, 1990 [JP] Japan .................................. 2-109690
May 24, 1990 [JP] Japan .................................. 2-134350

[51] Int. Cl.$^5$ .......................... G03C 1/00; G11B 11/03
[52] U.S. Cl. ................................. 430/271; 430/945; 430/495; 369/283; 369/288
[58] Field of Search ............... 430/271, 495, 945; 369/283, 284, 288; 346/135.1

[56] References Cited

U.S. PATENT DOCUMENTS

| | | | |
|---|---|---|---|
| 4,225,648 | 9/1980 | Hasegawa et al. | 430/58 |
| 4,469,771 | 9/1984 | Hasegawa et al. | 430/66 |
| 4,600,625 | 7/1986 | Abe et al. | 430/945 |
| 4,696,892 | 9/1987 | Abe et al. | 430/945 |
| 4,752,554 | 6/1988 | Sato et al. | 430/945 |
| 4,767,693 | 8/1988 | Oba et al. | 430/945 |
| 4,871,601 | 10/1989 | Miura et al. | 428/65 |
| 4,990,338 | 2/1991 | Hamada et al. | 430/945 |
| 5,019,476 | 5/1991 | Kanno et al. | 430/945 |
| 5,090,009 | 2/1982 | Hamada et al. | 369/284 |

FOREIGN PATENT DOCUMENTS

| | | |
|---|---|---|
| 319343 | 6/1989 | European Pat. Off. . |
| 2-18086 | 1/1990 | Japan . |
| 2-42652 | 2/1990 | Japan . |
| 2-87342 | 3/1990 | Japan . |
| 2-103754 | 4/1990 | Japan . |
| 2-201749 | 8/1990 | Japan . |
| 2193723 | 2/1988 | United Kingdom . |

OTHER PUBLICATIONS

Merck Index 10th Ed. Compound 2732 ©1983.
Patent Abstracts of Japan vol. 12 #257 20 Jul. 19, 1988 & JDA 63-039386 Feb. 19, 1988 *Abstract*.
Patent Abstracts of Japan, vol. 9, No. 327 (P-415)(2050) Dec. 21, 1985 and JP-A-60 151 850 (Nippon Denki K K) Aug. 9, 1985 *Abstract*.
Patent Abstracts of Japan, vol. 9, No. 25 (M-355)(1748) Feb. 2, 1985 and JP-A-59 171 690 (TDK) Sep. 28, 1984 *Abstract*.

Primary Examiner—Charles L. Bowers, Jr.
Assistant Examiner—Martin Angebrandt
Attorney, Agent, or Firm—Lowe, Price, LeBlanc & Becker

[57] ABSTRACT

An optical recording medium comprising a substrate (1), a colorant recording layer (2) on and from which information is capable of being recorded and reproduced, provided on said substrate (1), an intermediate layer (3) provided on said colorant recording layer (2), said intermediate layer (3) comprising a material that is transparent to recording-reproducing light, has a lower refractive index than that of a colorant contained in said colorant recording layer (2) and is soluble to an aliphatic or alicyclic hydrocarbon solvent, and a metal reflective layer (4) provided on said intermediate layer (3). A useful process for producing such a optical recording medium is also disclosed.

9 Claims, 1 Drawing Sheet

OPTICAL RECORDING MEDIUM AND PROCESS FOR PRODUCING IT

This application is a continuation of application Ser. No. 07/687,659 filed Apr. 19, 1991 now abandoned.

BACKGROUND OF THE INVENTION

1. Field of the Invention

This invention relates to an optical recording medium on and from which information can be optically recorded and reproduced. It also relates to a process for producing the same.

2. Description of the Prior Art

In recent years, optical disks from which any stored information is read out by utilization of light have been put into practical use. Such optical disks are made for reproducing sounds or animation images recorded in disks, using semiconductor laser beams, and have come into wide use as compact disks (hereinafter "CD") and video disks.

Development is energetically made also on optical disks on and from which information is recorded and reproduced by the irradiation with laser beams to cause changes in optical characteristics (refractive index, extinction coefficient, phases, etc.), what is called writing once optical disks.

Known methods include a method of recording information by irradiating a recording medium with a laser beam to cause melt evaporation so that holes or pits are made in the recording medium, where the recording medium is then continuously irradiated with a laser beam weak enough to cause no changes in the recording medium, to detect the presence of the pits on the basis of the strength of reflected light, and a method of recording information in which an amorphous recording medium with a low reflectance is heated by irradiation with a laser beam to cause phase changes so that the recording medium is brought into a crystalline state with a high reflectance.

Under such circumstances, no optical disk has been put into practical use in regard to an optical disk on and from which users can record information and reproduce the recorded information by means of a commercially available CD player.

The reason therefor is that in order to satisfy the CD standards it is required for the optical disk to have a reflectance through its substrate, of not less than 70% (i.e., to have a reflectance of 70% or more when, for example, a semiconductor laser beam with a wavelength of 780 nm is made incident on the optical disk from its readout side), and also to satisfy the conditions that a sufficient modulation degree can be achieved at a recording linear velocity of 1.2 to 1.4 m/s and that tracking error signals on a required level must be obtained.

In particular, the requirements that the information can be recorded using outputs from a semiconductor laser and yet the high reflectance must be achieved conflict with each other. Great efforts have been made so that this problem can be solved.

Incidentally, there is a recent progress in the practical utilization of colorant optical disks that have a lower thermal conductivity and higher recording sensitivity than metal type materials, have superior stability and also have the possibility of a cost decrease such that they can be manufactured using a relatively inexpensive apparatus. Such colorant optical disks, however, have some disadvantages, one of which is that they have a low reflectance.

Takeda, Shinohara, Kusakawa and Hirohashi, "JOHO KIROKU SISUTEMU ZAIRYO (Materials for Information Recording Systems)", Gakujutsu Shuppan Center, 1989, disclose that the reflectance of a colorant thin film can be improved by making large the refractive index n (the real part of a complex refractive index) of a colorant and making small the extinction coefficient k (the imaginary part of a complex refractive index), whereby the reflectance can be increased up to about 40%. They also report that a reflective film comprised of gold (Au) may be provided on a colorant coating film to make it possible to reproduce information by the use of commercially available CD players.

Now, in order to satisfy the CD standard that the reflectance is not less than 70% and to ensure the light absorbance at which it becomes possible to carry out recording, it is necessary to provide a reflective film comprised of Au, Ag, Pt or the like, having a high reflectance at wavelengths pertaining to semiconductor lasers. For example, Japanese Laid-open Patent Application No. 2-42652 discloses a writing once optical disk comprising a transparent substrate provided with tracking guide grooves, and a lamination of a recording film containing a special colorant and a reflective film comprised of Au having a high reflectance. This optical disk can attain the reflectance as prescribed in the CD standard, i.e. a reflectance of 70% to 90% against the light with wavelength of 780 nm at the land of the surface on which signals are recorded.

Such noble metals, however, result in a high cost, which is a disadvantage for achieving wide spread of optical disks. On the other hand, when an inexpensive metal such as aluminum or an aluminum is used for the reflective film, it is difficult to make up optical disks having the reflectance of 70% to 90%.

In order to increase the reflectance of the colorant itself, the colorant must be synthesized with newly designed molecular structure.

Moreover, although the reflectance can be increased when an inorganic interference layer having a high refractive index is provided between a colorant layer and a reflective layer, this requires film formation by vacuum deposition. The film formation by vacuum deposition, however, necessarily requires a large-scale apparatus and a long-term operation including the operation for evacuation carried out over a period of several hours, resulting in a high cost.

SUMMARY OF THE INVENTION

The present invention was made taking account of the above problems.

An object of the present invention is to provide an optical recording medium that can satisfy the requirements such as the reflectance of 70% or more so that users can record information and reproduce the recorded information by the use of a commercially available CD player.

Another object of the present invention is to provide a process for producing an optical recording medium that can satisfy the above requirements, without use of Au or the like for the formation of the reflective layer and without use of vacuum deposition or the like for the formation of the intermediate, interference layer.

The present invention provides an optical recording medium comprising;
 a substrate;

a colorant recording layer on and from which information is capable of being recorded and reproduced, provided on said substate;

an intermediate layer provided on said colorant recording layer, said intermediate layer comprising a material that is transparent to recording-reproducing light, has a lower refractive index than that of a colorant contained in said colorant recording layer and is soluble to an aliphatic or alicyclic hydrocarbon solvent; and a metal reflective layer provided on said intermediate layer.

In a preferred embodiment, the material contained in said intermediate layer comprises a petroleum resin or a polyurethane resin.

The present invention also provides a process for producing an optical recording medium, comprising the steps of;

coating on a transparent substrate provided with a tracking groove a coating composition prepared by dissolving a colorant in an alcohol type solvent, by spin coating to form a colorant recording layer on the surface of said substrate;

coating on said colorant recording layer a coating composition prepared by dissolving in an aliphatic or alicyclic hydrocarbon solvent a material that is transparent to recording-reproducing light, has a lower refractive index than that of the colorant contained in said colorant recording layer and is soluble to the aliphatic or alicyclic hydrocarbon solvent, by spin coating to form an intermediate layer; and forming on said intermediate layer a metal or metal alloy reflective layer by vacuum deposition or sputtering.

DESCRIPTION OF THE PREFERRED EMBODIMENTS

The present invention will be described below in detail with reference to the accompanying drawings.

Figure 1:
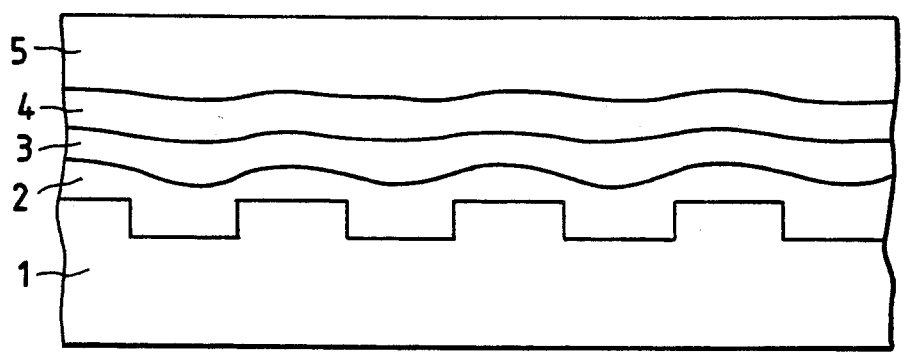
FIG. 1 is a schematic cross section of the optical recording medium according to the present invention.

FIG. 1 is a schematic cross section of the optical recording medium according to the present invention. In FIG. 1, the numeral 1 denotes a substrate comprised of a transparent substrate usually used in optical disks, made of a plastic material (including polycarbonates, acrylates, epoxy resins and polyolefins) or glass. The substrate is provided with tracking grooves in concentric circles or a tracking groove in a spiral on its recording surface. The numeral 2 denotes a colorant recording layer formed, for example, by spin coating. The colorant used here (which may be incorporated with a quencher) may include organic colorants such as cyanine dyes (in particular, an indolenine type cyanine dye), pyrylium dyes, squarilium dyes, croconium dyes, azulene dyes, pentamethine dyes, thioindigo dyes, anthraquinone dyes, naphthoquinone dyes, phthalocyanine dyes, naphthalocyanine dyes, porphyrin dyes, tetrahydrocholine dyes, dithiol dyes, diamine dyes, indoaniline dyes, dioxazine dyes and dithiazine dyes. The colorant recording layer may have a coating thickness of from 10 nm to 300 nm. A subbing layer may optionally be provided.

The numeral 3 denotes an intermediate layer serving as an interference film for increasing the amount of reflected light, i.e., reflectance. This intermediate layer comprises a material that is transparent to recording-reproducing light, has a lower refractive index than that of a colorant contained in said colorant recording layer and is soluble to a solvent of an aliphatic or alicyclic hydrocarbon type. Such a material may include resins such as petroleum resin, urethane resin and silicone resin, hydrocarbon compounds such as triphenylmethane, and various dyes or pigments. As a preferred material for constituting this layer, a petroleum resin or polyurethane resin is used, which can be applied without any attack or adverse affection on the colorant recording layer and the substrate.

Polycarbonate resin usually used as a material for the substrate is insoluble to alcohols, aliphatic or alicyclic hydrocarbons and mixed hydrocarbons. Hence, alcohol type solvents are used when the colorant recording layer is formed by coating. Accordingly, in order to provide the intermediate layer by coating without any attack on the colorant recording layer and the substrate, a solvent must be selected from aliphatic or alicyclic hydrocarbon solvents and mixed hydrocarbon solvents. The petroleum resin used as a material for the intermediate layer may include $C_5$ petroleum resins (or aliphatic petroleum resins obtainable using $C_5$ fractions as starting materials, $C_9$ petroleum resins (or aromatic petroleum resins) obtainable using $C_9$ fractions as starting materials, $C_5$-$C_9$ copolymer petroleum resins obtainable using $C_5$ and $C_9$ fractions as starting materials, and cyclopentadiene petroleum resins obtainable by thermal dimerization of cyclopentadiene. These petroleum resins are soluble to aliphatic or alicyclic hydrocarbon solvents and mixed hydrocarbon solvents, and hence the thin film intermediate layer can be formed by coating.

The polyurethane resin, stated more specifically an oil-modified polyurethane resin, also usable as a material for the intermediate layer is soluble to the aliphatic or alicyclic hydrocarbon solvents and mixed hydrocarbon solvents, and hence the thin film intermediate layer can also be formed by coating.

The aliphatic hydrocarbons herein referred to may include pentane, isopentane, hexane, isohexane, methyl pentane, heptane, isoheptane, octane, isooctane, nonane, decane (in particular, n-decane), dodecane, dodecane, cetane and cetene. The alicyclic hydrocarbons may include cyclopentane, methylcyclopentane, cyclohexane, methylcyclohexane, bicylohexyl, Tetralin (trademark for tetrahydronaphthalene, produced by Du Pont) and Decalin (trademark for decahydronaphthalene, produced by Du Pont).

The mixed hydrocarbons refer to mixtures of a variety of hydrocarbons, and their solvents can be roughly grouped into petroleum solvents, coal-tar solvents and terpene solvents, which include industrial gasoline, petroleum ether, petroleum naphtha and hydrogenated petroleum naphtha. A coating solution is prepared by dissolving the petroleum resin or the polyurethane resin in any of these aliphatic hydrocarbon solvents, alicyclic hydrocarbon solvents and mixed hydrocarbon solvents.

The coating solution thus prepared is coated on the colorant recording layer, followed by drying to form an intermediate layer.

It can be coated by spin coating, spray coating, dip coating, blade coating or the like. The intermediate layer should have a coating thickness in the range of from 5 nm to 500 nm, and preferably in the range of from 10 nm to 200 nm. On this intermediate layer 3, a metal reflective layer 4 is provided. Metals used to form this metal reflective layer 4 may include Au, Ag, Cu, Al, In, Pt, Cr, Ni, and alloys of any of these. From the viewpoint of cost and conventional processes for manufacturing compact disks, it is more preferable and advantageous to use Al as aimed in the present invention than to use noble metals. The metal reflective layer 4 is formed by vacuum deposition or sputtering in a layer thickness of from 10 nm to 500 nm, and preferably from 50 nm to 100 nm. On this metal reflective layer, a protective film 5 may be optionally provided usually in a thickness of from 1 to 20 μm. This protective layer 5 can be formed using an ultraviolet-curable resin, a heat-curable resin, a plasma polymerized film or the like.

The present invention will be described below in greater detail by giving Examples.

EXAMPLE 1

On a polycarbonate substrate 1 on which a tracking guide groove had been formed in a spiral, a solution prepared by dissolving 3 parts by weight of an indolenine type cyanine dye with the following structural formula in 97 parts by weight of ethyl cellosolve was applied by spin coating to form a colorant recording layer 2 with a coating thickness of about 50 nm.

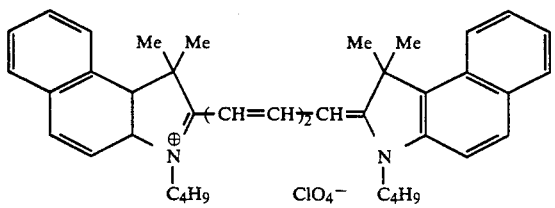

On this colorant recording layer, a solution prepared with the following composition to have a resin concentration of 1% by weight was applied by spin coating to form an intermediate layer 3.

| | |
|---|---|
| Cyclopentadiene petroleum resin (trade name: QUINTONE 1325; produced by Nippon Zeon Co., Ltd.) | 1 part by weight |
| n-Decane | 99 parts by weight |

The spin coating was carried out at a revolution number of 1,500 rpm, followed by drying at a temperature of 70° C. for 2 hours to form the intermediate layer 3 in a coating thickness of about 50 nm. Then, on this intermediate layer 3, Al was deposited by sputtering in a layer thickness of 60 nm to form a metal reflective layer 4. On the metal reflective layer 4 thus formed, a protective layer 5 comprised of an ultraviolet-curable acrylic resin SD-17 (trade name; produced by Dainippon Ink & Chemicals, Incorporated) was formed by spin coating in a thickness of about 5 μm. An optical recording medium was thus produced.

EXAMPLE 2

Example 1 was repeated to produce an optical recording medium, except that the resin concentration was changed to 2.5% by weight.

EXAMPLE 3

Example 1 was repeated to produce an optical recording medium, except that the resin concentration was changed to 5% by weight.

The relationship between resin concentration and reflectance is shown in Table 1 below.

TABLE 1

| | Resin concentration (wt. %) | Reflectance (%) |
|---|---|---|
| Example 1: | 1 | 70 |
| Example 2: | 2.5 | 75 |
| Example 3: | 5 | 81 |
| Comparative Example 1: | None | 66 |

As is evident from the above table, the providing of the intermediate layer 3 brings about an increase in reflectance, which increases with an increase in the resin concentration. This also indicates that the desired reflectance can be readily achieved by controlling the resin concentration in the intermediate layer. In Examples 1 to 3, the reflectance was not less than 70% (measurement wavelength: 780 nm), satisfying the CD standard.

While the optical recording medium produced in Example 2 was rotated at a linear velocity of 1.4 m/s, EFM (eight to fourteen modulation) signals were recorded using an intensity-modulated semiconductor laser beam (wavelength: 780 nm). The optical recording medium with recorded information was put on a commercially available player RC-X35 (trade name; manufactured by Victor Co. of Japan, Ltd.). As a result, it was possible to reproduce the recorded information without any problems at all.

EXAMPLE 4

An optical recording medium was produced in the same manner as in Example 1 except that the intermediate layer was provided using a solution prepared with the following composition.

| | |
|---|---|
| Cyclopentadiene petroleum resin (trade name: QUINTONE 1345; produced by Nipon Zeon Co., Ltd.) | 5 parts by weight |
| Decalin | 95 parts by weight |

In this optical recording medium, the reflectance was not less than 79% (measurement wavelength: 780 nm), satisfying the CD standard.

While the optical recording medium thus produced was rotated at a linear velocity of 1.4 m/s, EFM signals were recorded using an intensity-modulated semiconductor laser beam (wavelength: 780 nm). The optical recording medium with recorded information was put on a commercially available player RC-X35 (trade name; manufactured by Victor Co. of Japan, Ltd.). As a result, it was possible to reproduce the recorded information without any problems at all.

COMPARATIVE EXAMPLE 1

In Comparative Examples 1 to 3, no intermediate layer was provided. In such an instance, the reflectance was 66% (measurement wavelength: 780 nm), not satisfying the CD standard.

COMPARATIVE EXAMPLE 2

On the same polycarbonate substrate as used in Example 1, the same colorant recording layer as in Example 1 was formed by spin coating.

On this colorant recording layer, a solution prepared with the following composition was applied by spin coating to form an intermediate layer 3 in the same manner as in Example 1.

| | |
|---|---|
| Polyvinyl butyral resin (trade name: S-LEC-BM-1; produced by Sekisui Chemical Co., Ltd. | 3 parts by weight |
| Diacetone alcohol | 97 parts by weight |

This resulted in dissolution of the colorant recording layer. Thus it was impossible to carry out recording.

EXAMPLE 5

On a polycarbonate substrate 1 on which a tracking guide groove had been formed in a spiral, a solution prepared by dissolving 3 parts by weight of the same cyanine dye as used in Example 1, in 97 parts by weight of ethyl cellosolve was applied by spin coating to form a colorant recording layer 2 with a coating thickness of about 50 nm.

On this colorant recording layer, a solution prepared with the following composition was applied by spin coating to form an intermediate layer 3.

| | |
|---|---|
| Oil-modified polyurethane resin (trade name: BURNOCK TD-125-HD; produced by Dainippon Ink & Chemicals, Incorporated) | 10 parts by weight |
| n-Decane | 90 parts by weight |

The spin coating was carried out at a revolution number of 2,000 rpm, followed by drying at a temperature of 70° C. for 2 hours to form the intermediate layer 3 in a coating thickness of about 50 nm. Then, on this intermediate layer 3, Al was deposited by sputtering in a layer thickness of 60 nm to form a metal reflective layer 4. On the metal reflective layer 4 thus formed, a protective layer 5 comprised of an ultraviolet-curable acrylic resin SD-17 (trade name; produced by Dainippon Ink & Chemicals, Incorporated) was formed by spin coating in a thickness of about 5 μm. An optical recording medium was thus produced.

The reflectance of this optical recording medium was 78% (measurement wavelength: 780 nm), satisfying the CD standard.

While this optical recording medium was rotated at a linear velocity of 1.4 m/s, EFM signals were recorded using an intensity-modulated semiconductor laser beam (wavelength: 780 nm). The optical recording medium with recorded information was put on a commercially available player RC-X35 (trade name; manufactured by Victor Co. of Japan, Ltd.). As a result, it was possible to reproduce the recorded information without any problems at all.

EXAMPLE 6

On the same polycarbonate substrate as used in Example 5, the same colorant recording layer as in Example 5 was formed by spin coating.

On this colorant recording layer, a solution prepared with the following composition was applied by spin coating to form an intermediate layer 3.

| | |
|---|---|
| Oil-modified polyurethane resin trade name: BURNOCK TD-125-HD; produced by Dainippon Ink & Chemicals, Incorporated) | 5 parts by weight |
| i-Octane | 95 parts by weight |

The spin coating was carried out at a revolution number of 2,000 rpm, followed by drying at a temperature of 70° C. for 2 hours to form the intermediate layer 3 in a coating thickness of about 50 nm. Then, on this intermediate layer 3, Al was deposited by sputtering in a layer thickness of 60 nm to form a metal reflective layer 4. On the metal reflective layer 4 thus formed, a protective layer 5 comprised of an ultraviolet-curable acrylic resin SD-17 (trade name; produced by Dainippon Ink & Chemicals, Incorporated) was formed by spin coating in a thickness of about 5 μm. An optical recording medium was thus produced.

The reflectance of this optical recording medium was 79% (measurement wavelength: 780 nm), satisfying the CD standard.

While this optical recording medium was rotated at a linear velocity of 1.4 m/s, EFM signals were recorded using an intensity-modulated semiconductor laser beam (wavelength: 780 nm). The optical recording medium with recorded information was put on a commercially available player RC-X35 (trade name; manufactured by Victor Co. of Japan, Ltd.). As a result, it was possible to reproduce the recorded information without any problems at all.

EXAMPLE 7

On the same polycarbonate substrate as used in Example 5, the same colorant recording layer as in Example 5 was formed by spin coating.

On this colorant recording layer, a solution prepared using an oil-modified polyurethane resin (trade name: BURNOCK TD-125-HD; produced by Dainippon Ink & Chemicals, Incorporated) in resin concentration varied as shown in Table 2 was applied by spin coating to form an intermediate layer 3. The solvent used was i-octane.

The spin coating was carried out at a revolution number of 1,500 rpm, followed by drying at a temperature of 70° C. for 2 hours to form the intermediate layer 3 in a coating thickness of about 50 nm. Then, on this intermediate layer 3, Al was deposited by sputtering in a layer thickness of 70 nm to form a metal reflective layer 4.

On the optical recording mediums thus produced, a semiconductor laser beam (wavelength: 780 nm) was made incident from its substrate side, and the reflectance was measured to obtain the values shown in Table 2.

TABLE 2

| Resin concentration (wt. %) | Reflectance (%) |
|---|---|
| 5 | 83 |
| 10 | 86 |
| None | 51 |

As is evident from the above table, the reflectance is improved with an increase in the resin concentration. This also indicates that the desired reflectance can be achieved by controlling the resin concentration in the intermediate layer. In the mean time, the reflectance was 84%, measured when the laser beam was made incident from the Al reflective layer side, the side opposite to the substrate 1.

COMPARATIVE EXAMPLE 3

In Example 5, no intermediate layer was provided. In such an instance, the reflectance was 60% (measurement wavelength: 780 nm), not satisfying the CD standard.

COMPARATIVE EXAMPLE 4

On the same polycarbonate substrate as used in Example 5, the same colorant recording layer as in Example 5 was formed by spin coating.

On this colorant recording layer, a solution prepared with the following composition was applied by spin coating to form an intermediate layer 3 in the same manner as in Example 5.

| | |
|---|---|
| Polyvinyl butyral resin (trade name: S-LEC-BM-1; produced by Sekisui Chemical Co., Ltd. | 3 parts by weight |
| Diacetone alcohol | 97 parts by weight |

This resulted in dissolution of the colorant recording layer. Thus it was impossible to carry out recording.

EXAMPLE 8

On a polycarbonate substrate 1 on which a tracking guide groove of 1.6μ in pitch had been formed in a spiral, a solution prepared by dissolving 3 parts by weight of the same cyanine dye as used in Example 1, in 97 parts by weight of ethyl cellosolve was applied by spin coating to form a colorant recording layer 2 with a coating thickness of about 50 nm.

On this colorant recording layer, a solution prepared with the following composition was applied by spin coating to form an intermediate layer 3.

| | |
|---|---|
| Cyclopentadiene petroleum resin trade name: QUINTONE 1325; produced by Nippon Zeon Co., Ltd.) | 0.5 to 5.0 parts by weight |
| n-Decane | 95.0 to 99.5 parts by weight |

The spin coating was carried out at a revolution number of 1,000 to 3,000 rpm, followed by drying at a temperature of 60° C. at maximum for 1 hour at minimum to form the intermediate layer 3 in a coating thickness of from about 10 nm to about 200 nm. Then, on this intermediate layer 3, Al was deposited by sputtering in a layer thickness of about 50 nm to form a metal reflective layer 4. On the metal reflective layer 4 thus formed, a protective layer 5 comprised of an ultraviolet-curable acrylic resin SD-17 (trade name; produced by Dainippon Ink & Chemicals, Incorporated) was formed by spin coating in a thickness of about 5 μm. An optical recording medium was thus produced.

Figure 2:
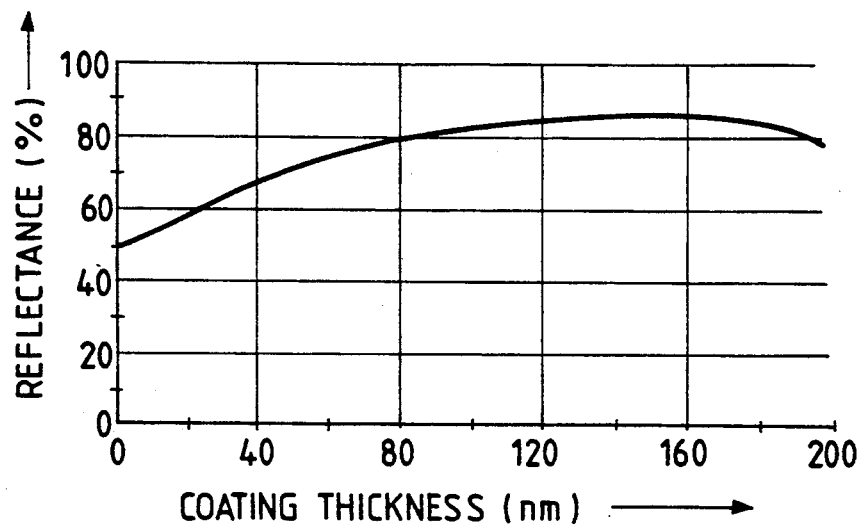
FIG. 2 is a graph to show reflectance characteristics of optical recording mediums obtained by the process for producing an optical recording medium according to the present invention.

In the production of the above optical recording medium, carried out by varying the concentration of the petroleum resin in the coating solution, the revolution number for spin coating and the drying conditions, the coating thickness of the intermediate layer was also varied to examine the relationship between coating thickness and reflectance. FIG. 2 shows changes in reflectance with respect to the changes in the coating thickness of the intermediate layer. The desired reflectance can also be achieved by controlling the concentration of resin of the intermediate layer.

As having been described above, the optical recording medium according to the present invention comprises a substrate, a colorant recording layer on and from which information is capable of being recorded and reproduced, provided on said substrate, an intermediate layer provided on said colorant recording layer, and a metal reflective layer provided on said colorant recording layer, wherein the intermediate layer is specifically comprised as previously described. Thus, the intermediate layer can be formed with ease by the use of a relatively inexpensive apparatus, and the reflectance can also be improved.

Moreover, according to the optical recording medium of the present invention, the reflective layer can be formed using Al, and hence it becomes possible to greatly decrease cost. An optical recording medium of a recording type, satisfying the CD standard, can also be produced with ease.

The optical recording medium according to the present invention can be used not only in an optical disk interchangeable for the CD, but also for the purpose of improving the reflectance of all sorts of optical disks. Thus, it is possible to improve the reproduction and tracking performances.

What is claimed is:

1. An optical recording medium comprising:
   a polycarbonate resin substrate;
   a colorant recording layer on and from which information is capable of being recorded and reproduced, provided on said substrate;
   an intermediate layer provided on said colorant recording layer, said intermediate layer comprising a petroleum resin or polyurethane resin that is transparent to recording-reproducing light, said intermediate layer having a lower refractive index than that of a colorant contained in said colorant recording layer and being capable of providing a higher reflectance to the recording-reproducing light made incident from the side of said substrate, than in an instance in which no intermediate layer is formed, petroleum resin or polyurethane resin being soluble to an aliphatic or alicyclic hydrocarbon solvent; and
   an aluminum or aluminum alloy reflective layer provided on said intermediate layer.

2. An optical recording medium according to claim 1, wherein said petroleum resin is a cyclopentadiene petroleum resin.

3. An optical recording medium according to claim 1, wherein said polyurethane resin is an oil-modified polyurethane resin.

4. An optical recording medium according to claim 1, wherein said colorant recording layer comprises an indolenine type cyanine dye.

5. A process for producing an optical recording medium, comprising the steps of:
   coating on a polycarbonate resin substrate provided with a tracking groove a coating composition prepared by dissolving a colorant in an alcohol type solvent and spin coating said colorant to form a colorant recording layer on the surface of said substrate;
   coating on said colorant recording layer a coating composition prepared by dissolving in an aliphatic or alicyclic hydrocarbon solvent a petroleum resin or polyurethane resin that is transparent to recording-reproducing light, has a lower refractive index than that of the colorant contained in said colorant recording layer, is capable of providing a higher reflectance to the recording-reproducing light made incident from the side of said substrate than in an instance in which no intermediate layer is formed, and is soluble to the aliphatic or alicyclic hydrocarbon solvent, by spin coating to form an intermediate layer; and forming on said intermediate layer an aluminum or aluminum alloy reflective layer by vacuum deposition or sputtering.

6. A process for producing an optical recording medium according to claim 5, wherein said petroleum resin is a cyclopentadiene petroleum resin.

7. A process for producing an optical recording medium according to claim 5, wherein said polyurethane resin is an oil-modified polyurethane resin.

8. A process for producing an optical recording medium according to claim 5, wherein the aliphatic or alicyclic hydrocarbon solvent is n-decane or decahydronaphthalene.

9. A process for producing an optical recording medium according to claim 5, wherein said colorant recording layer comprises an indolenine type cyanine dye.

* * * * *